(12) United States Patent
Ludmann et al.

(10) Patent No.: US 7,284,532 B2
(45) Date of Patent: Oct. 23, 2007

(54) INTAKE MODULE FOR AN INTERNAL COMBUSTION ENGINE

(75) Inventors: Armin Ludmann, Gerlingen (DE); Ettore Nocera, Besigheim (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/484,707

(22) Filed: Jul. 12, 2006

(65) Prior Publication Data

US 2007/0012275 A1    Jan. 18, 2007

(30) Foreign Application Priority Data

Jul. 14, 2005   (DE) .................. 20 2005 011 254 U (51) Int. Cl.
*F02B 31/00*    (2006.01)
(52) U.S. Cl. ...................................... 123/306; 123/308
(58) Field of Classification Search ................ 123/306, 123/308
See application file for complete search history.

(56) References Cited

U.S. PATENT DOCUMENTS 6,216,666 B1    4/2001   Handl et al.

2004/0226536 A1*  11/2004  Sakai et al. ................. 123/308

FOREIGN PATENT DOCUMENTS

| DE | 195 03 771 A1 | 8/1996 |
| DE | 19919533 A1 | 11/1999 |
| EP | 0701057 B1 | 3/1996 |
| EP | 1101916 B1 | 5/2001 |
| JP | 9-126970 A | 5/1997 |

OTHER PUBLICATIONS

European Search Report dated Nov. 2, 2006 (Eight (8) pages).

* cited by examiner

*Primary Examiner*—Noah P. Kamen
(74) *Attorney, Agent, or Firm*—Crowell & Moring LLP

(57) ABSTRACT

An intake module (1) for an internal combustion engine including a plurality of intake tracts (2, 3, 4, 5) in each of which two intake pipe openings (21, 22; 31, 32; 41, 42; 51, 52) are formed. One of the intake pipe openings (21, 31, 41, 51) in each intake tract has a constant cross section, and the second intake pipe opening has a flow cross section which can be varied depending on the operating mode of the engine. The two intake pipe openings in each intake tract are separated from each other by a partition (23, 33, 43, 53) which is inserted into a housing (6) in which the intake tracts (2, 3, 4, 5) are formed, and a movable component (7) is mounted on each of the partitions (23, 33, 43, 53) for varying the flow cross section of the second intake pipe opening (22, 32, 42, 52) of the respective intake tract.

20 Claims, 6 Drawing Sheets

INTAKE MODULE FOR AN INTERNAL COMBUSTION ENGINE

BACKGROUND OF THE INVENTION

The present invention relates to an intake module, in particular for an internal combustion engine.

Published German patent application no. DE 195 03 771 describes an intake module for an internal combustion engine comprising at least one intake tract. The intake tract has two intake pipe openings which are arranged side-by-side in a flange component. One of the intake pipe openings is constructed so that its cross section remains unchanged and the other intake pipe opening contains a rotary slide valve by which the cross section of this intake pipe opening can be varied.

An intake module of this type operates reliably and results in no additional part presenting an obstacle to flow resistance in operating states in which only a portion of the intake pipe cross section is needed, and this assists in reducing fuel consumption. In operating states in which an expanded cross section is required, the cross-sectional area is adapted optimally via the rotary slide valve that can be switched on.

SUMMARY OF THE INVENTION

It is an object of the invention to provide an improved intake module for an internal combustion engine.

Another object of the invention is to provide an intake module which has a simple construction and can be varied in its design.

These and other objects are achieved in accordance with the present invention by providing an intake module for an internal combustion engine having at least one intake tract which has at least two intake pipe openings, a first one of said at least two intake pipe openings having an essentially constant cross section leading to the internal combustion engine and a second one of said at least two intake pipe openings of the same intake tract having a variable flow cross section, in which the intake tract is formed in a housing in which a partition is provided for separating the intake pipe openings of the same intake tract from one another in a certain section, and a movable component is supported on the partition for varying the flow cross section of the second intake pipe opening.

One advantage of the intake module according to the invention is that the partition is initially manufactured as a separate component, and then after installation of the movable component, which preferably is constructed as a flap valve, the partition is inserted into the respective intake tract in the intake module. In this way, the housing in which the intake tract is formed can be simpler in design, particularly with regard to the bearing for the movable component, because the bearings are also constructed on the partition. Thus, any required changes in the partition, the valve or the bearings can be made easily without requiring any change in the housing.

The flap valve is preferably a flap valve mounted on one side so it can pivot about an axis. Journal bearings supported in bearing openings in the partition are preferably used as the bearings for the moveable valve. The journal bearings are preferably constructed in one piece with the flap valve, and bearing bushings may be used to reduce bearing friction. Such bearing bushings are usually made of a material having good sliding properties. It may be desirable for the two journal bearings provided on a flap valve as well as the bearing openings in the partition to have different diameters. This makes it possible to provide the journal bearing having the larger diameter with an opening on the end into which another component can be inserted, so that the moveable valve may be connected directly or indirectly to an operating device or actuator.

Another advantage of the invention is that the flap valve is adjustable between two positions such that the second intake pipe opening is completely opened in a first position of the flap valve and is completely closed in a second position. The arrangement may be such that the flap valve in the first position fits completely within the contour of the partition so that no flow resistance is created by the flap valve in this position.

In accordance with one preferred embodiment of the invention, the pivot axis is at the end of the flap valve which is farther to the rear, as seen in the direction of flow, in the second intake pipe opening. With such an arrangement, it may be advantageous to provide an opening in the partition in front of the pivot axis of the flap valve, corresponding at least approximately to the flap valve contour and being closeable by the flap valve when the valve is in the first position. In such an embodiment, when the flap valve is in the second position in the second intake pipe opening, the intake air stream striking the flap valve is directed into the first intake pipe opening through the opening in the partition.

In accordance with another embodiment of the invention, the pivot axis is situated at the end of the flap valve which is located farther toward the front as viewed in the direction of flow in the second intake pipe opening. In this case, the length of the partition may be shortened. It is also advantageous if an operating rod is provided which operates all the flaps in one section module simultaneously. Thus only a single actuator drive, which produces a longitudinal movement of the operating rod, is necessary. To convert the longitudinal movement of the operating rod into a pivoting movement of the flap valve bearing, it is necessary to arrange a lever on each journal bearing of each flap valve and to connect the free end of the lever to the operating rod.

A particularly advantageous and simple arrangement and attachment of the partition in the intake tract may be obtained by providing grooves in the intake tract in which lateral edges of the partition are received. It may be advantageous for the lateral edges of the partition to be constructed as frame members having a width which is greater than the thickness of the partition. In such an embodiment, enough space for the bearing is provided in the frame members, but the material complexity and expense for the partition itself may be minimized. In one advantageous embodiment the frame parts on a partition may be of different lengths, where the front edge of the partition extends obliquely in relation to the width of the partition. Alternatively, the frame parts may also be of equal lengths, in which case the front edge of the partition is designed to be concave in relation to the width of the partition.

The contour of the flap valve may be adapted or matched to the design of the intake tract and/or the suction pipe openings. In such a case, the flap valve may advantageously have a valve body in which the end remote from the pivot axis has curved or rounded sides.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
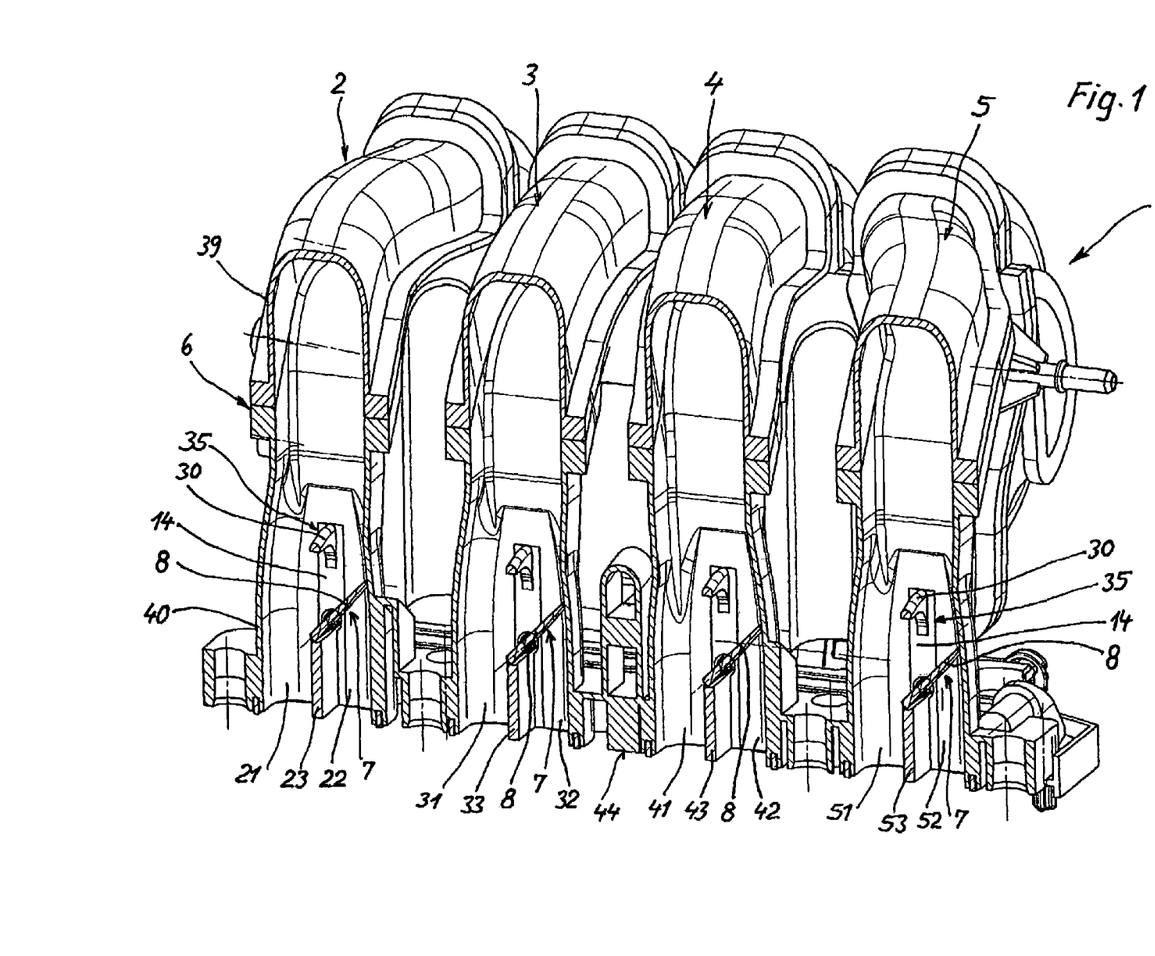
FIG. 1 is a partial sectional view through an intake module according to the invention comprising a plurality of intake tracts.

FIG. 1 shows an intake module 1 in which four intake tracts 2, 3, 4 and 5 are provided in a housing 6. The housing 6 comprises a top shell 39 and a bottom shell 40. A flange 44 for mounting the intake module 1 on a cylinder head of an internal combustion engine is formed on the bottom of the bottom shell 40.

A partition 23 is provided in the section of the intake tract 2 extending in the bottom shell 40. Partition 23 subdivides this section of the intake tract 2 into a first intake pipe opening 21 and a second intake pipe opening 22. In the same way, a first intake pipe opening 31 and a second intake pipe opening 32 are formed by a partition 33 in the intake tract 3. This is also true of intake tracts 4 and 5 in which a partition 43 and/or 53, respectively, is inserted in a corresponding manner. A groove 35 extending in the longitudinal direction of the intact tract is provided on the wall of the respective intact tract 2, 3, 4, 5, for accommodating the edge of the respective partition 23, 33, 43, 53. The arrangement of such a groove 35 serves to accurately determine the position of the partition 23, 33, 43, 53, so that it can be assembled more easily from the bottom side, i.e., from the flange 44.

Each of the partitions 23, 33, 43, 53 has a movable component 7, which in this illustrative embodiment is constructed as a pivotable flap valve 8. The pivotable flap valve 8 is provided with corresponding bearings (to be discussed in greater detail later) at its lower end. The flaps 8 are arranged in such a way that they are flush with the partition 23, 33, 43, 53 in a first position and thus close an opening 14 provided in the partition. Thus the same average cross section is provided in both intake pipe openings 21, 22 and/or 31, 32 and/or 41, 42 and/or 51, 52. In the second position of the flap valve 8 illustrated in FIG. 1, the flap closes the second intake pipe opening 22, 32, 42, 52 and thus opens the opening 14 in the partition 23, 33, 43, 53. The entire air stream drawn into the respective intact tract 2, 3, 4, 5 is then passed through the respective first intake pipe opening 21, 31, 41 and 51. The front edge (in the direction of flow) of the respective partition 23, 33, 43, 53 is labeled with the reference numeral 30.

Figure 2:
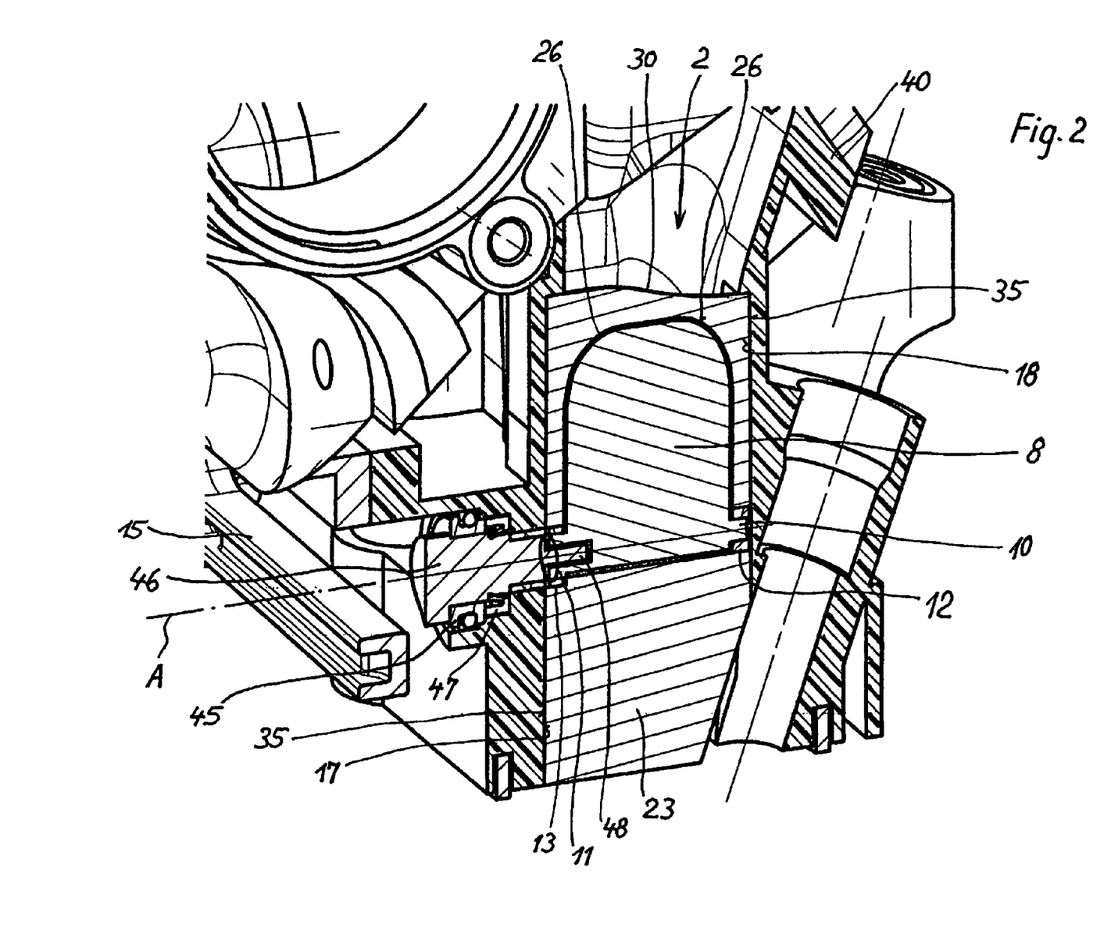
FIG. 2 is a sectional view through the partition and flap valve in an intake tract in the plane of the partition.

FIG. 2 shows a section through the bottom portion of the intake tract 2 with the partition 23 arranged therein as well as the flap valve 8. It can be seen in this figure that two opposing grooves 35 are arranged in the bottom shell 40 in the wall of the intact tract 2 for receiving the lateral edges of the partition 23. Bearing openings 12 and 13 for the journal bearings 10 and 11 are provided in the partition 23. It can also be seen from the figure that journal bearing 10 is smaller than the journal bearing 11. Due to the greater diameter of the journal bearing 11, it is possible to provide an opening or socket on the end face on the corresponding journal with which a square head 48 that is integrally molded on the end face of an additional bearing element engages. This additional bearing element is part of the supporting bearing 45 and is constructed in one piece with an operating lever 46 which is connected to operating rod 15, as explained in greater detail below. Upon displacement of the operating rod 15, the flap valve 8 can be pivoted about the axis A. As also shown in FIG. 2, the flap valve 8 is provided without rounded shapes 26 on the end facing away from the pivot axis A. The front edge 30 of the partition 23 viewed in the direction of oncoming flow is constructed with a slope as shown in the diagram in FIG. 2, i.e., the side edges of the partition 23 are of different lengths.

Figure 3:
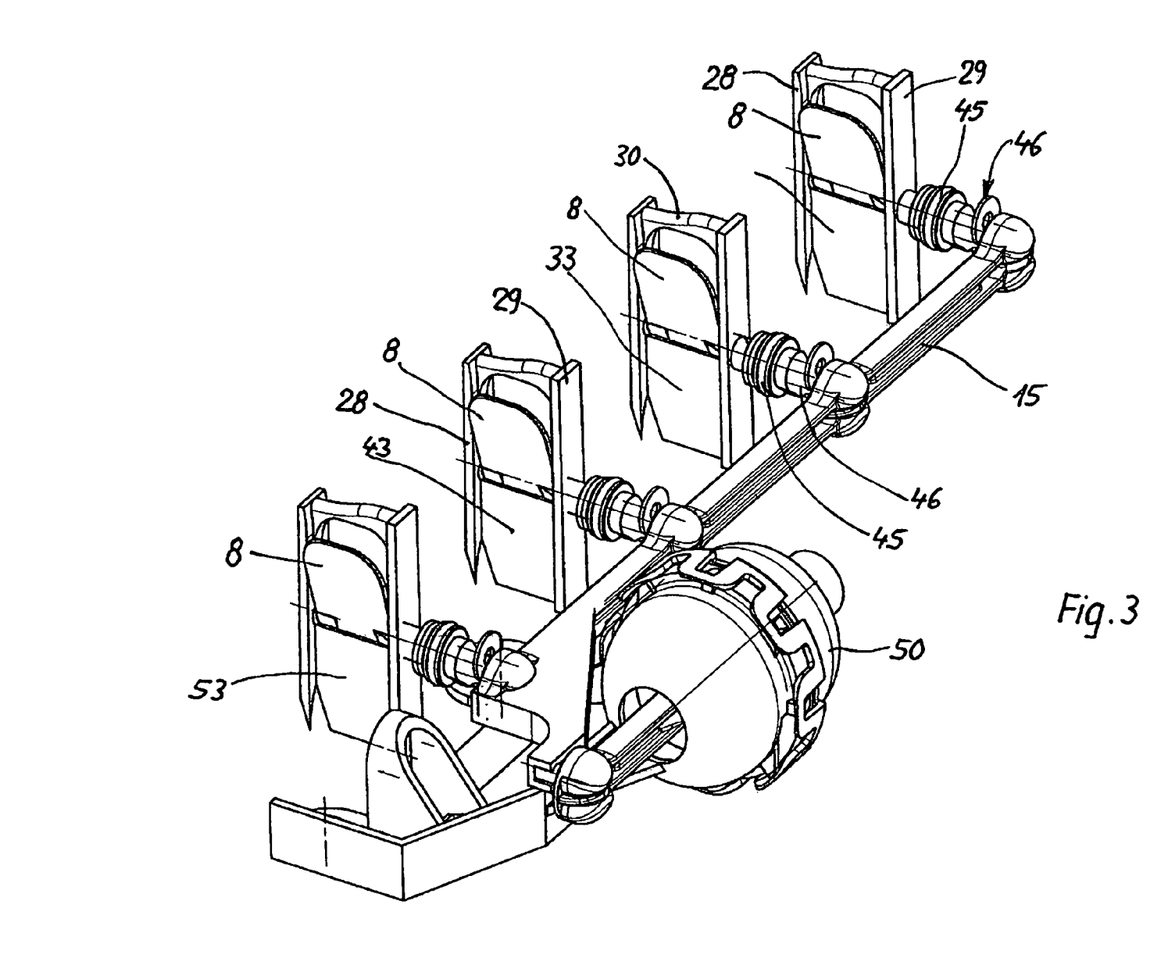
FIG. 3 is a perspective view of the partitions with flaps and the operating device for an intake module according to FIG. 1.

FIG. 3 is a perspective diagram of the four partitions 23, 33, 43, 53 with the respective valve flaps 8 and an operating device for pivoting the flaps 8. The operating device includes an operating rod 15 which is linearly displaceable and is connected via corresponding operating levers 46 to the flaps 8. An actuator drive 50 is provided for displacement of the operating rod 15. In the illustrated embodiment, the actuator drive is constructed as a vacuum unit, but it should be understood that other types of actuators could be used in lieu of the vacuum drive.

As also shown in FIG. 3, the supporting bearing 45, which is supported in the bottom shell of the housing in the diagram in FIG. 2, is situated next to the lever 46. The partitions 23, 33, 43, 53 each have side frame parts 28 and 29, with the frame parts 28 being constructed somewhat shorter than frame parts 29. For this reason, the contour of the front edge of the partition slopes slightly from the frame part 29 to frame part 28.

Figure 4:
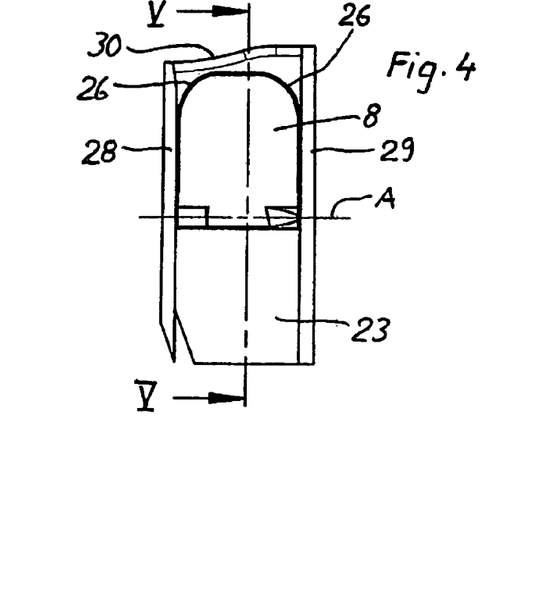
FIG. 4 is a front view of partition with a flap valve.
Figure 6:
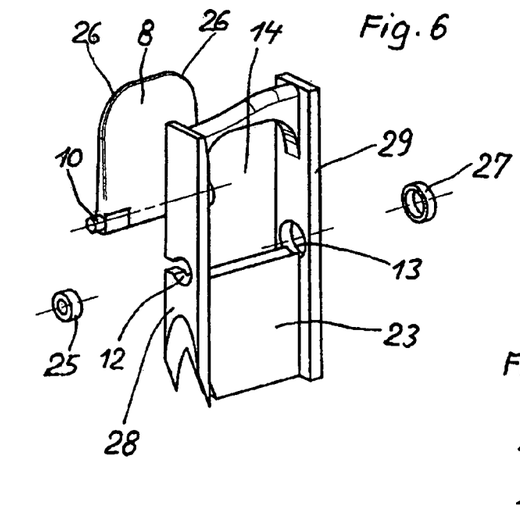
FIG. 6 is an exploded diagram of the partition with the flap valve.

FIG. 4 is a front view of the partition 23 with the side frame parts 28 and 29. The front edge 30, which is the first to come in contact with the flow, extends from the frame part 29 to the frame part 28 with a slight slope. The receptacles for the journal bearings 10 and 11 are provided in the frame parts 28 and 29, as illustrated in FIG. 6. FIG. 6 also shows that bearing bushings 25 and 27 are used to reduce the friction in operation of the flap valve 8. As shown in FIGS. 4 and 6, the flap valve 8 is provided with rounded shapes 26 on the end facing away from the pivot axis A.

Figure 5:
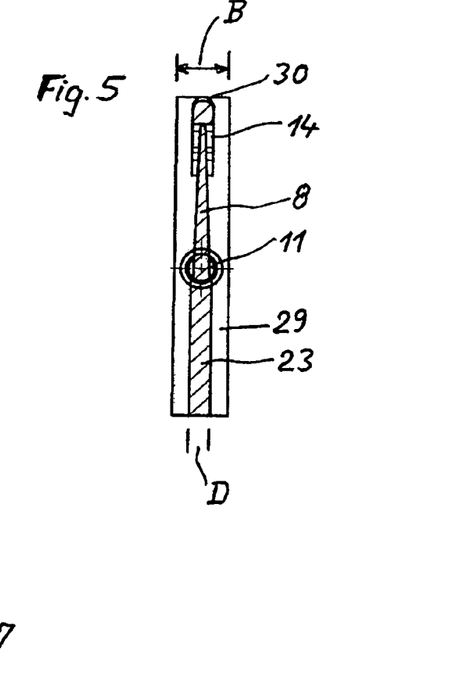
FIG. 5 is a section along line V-V in FIG. 4.

FIG. 5 is a sectional view taken along line V-V in FIG. 4. It can be seen from FIG. 5 that the flap valve 8 is mounted in the middle of the partition 23, such that when the flap valve is in the first position, it is flush with the partition 23. It thus closes the opening 14 in the upper part of the partition 23. It can also be seen from FIGS. 5 and 6 that the width B of the frame parts 28 and 29 is greater than the thickness D of the partition 23, so the partition 23 can be designed to save on materials to the greatest possible extent whereas enough room for the arrangement of the bearing openings 12 and 13 is available in the frame parts 28 and 29.

Figure 7:
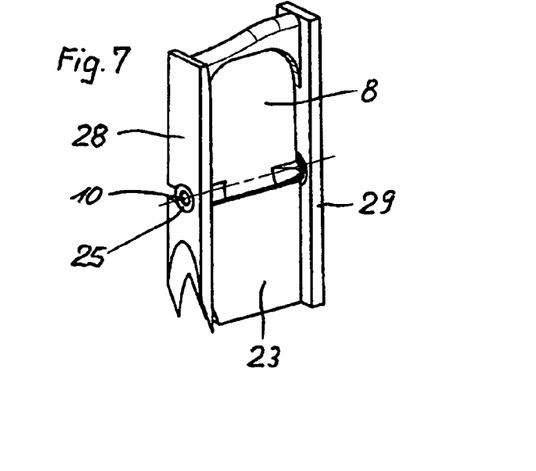
FIG. 7 is a perspective diagram of the arrangement according to FIG. 4.

FIG. 7 is a perspective view of the arrangement according to FIG. 4, in which corresponding parts are identified by the same reference numerals as in FIGS. 4 and 6.

Figure 8:
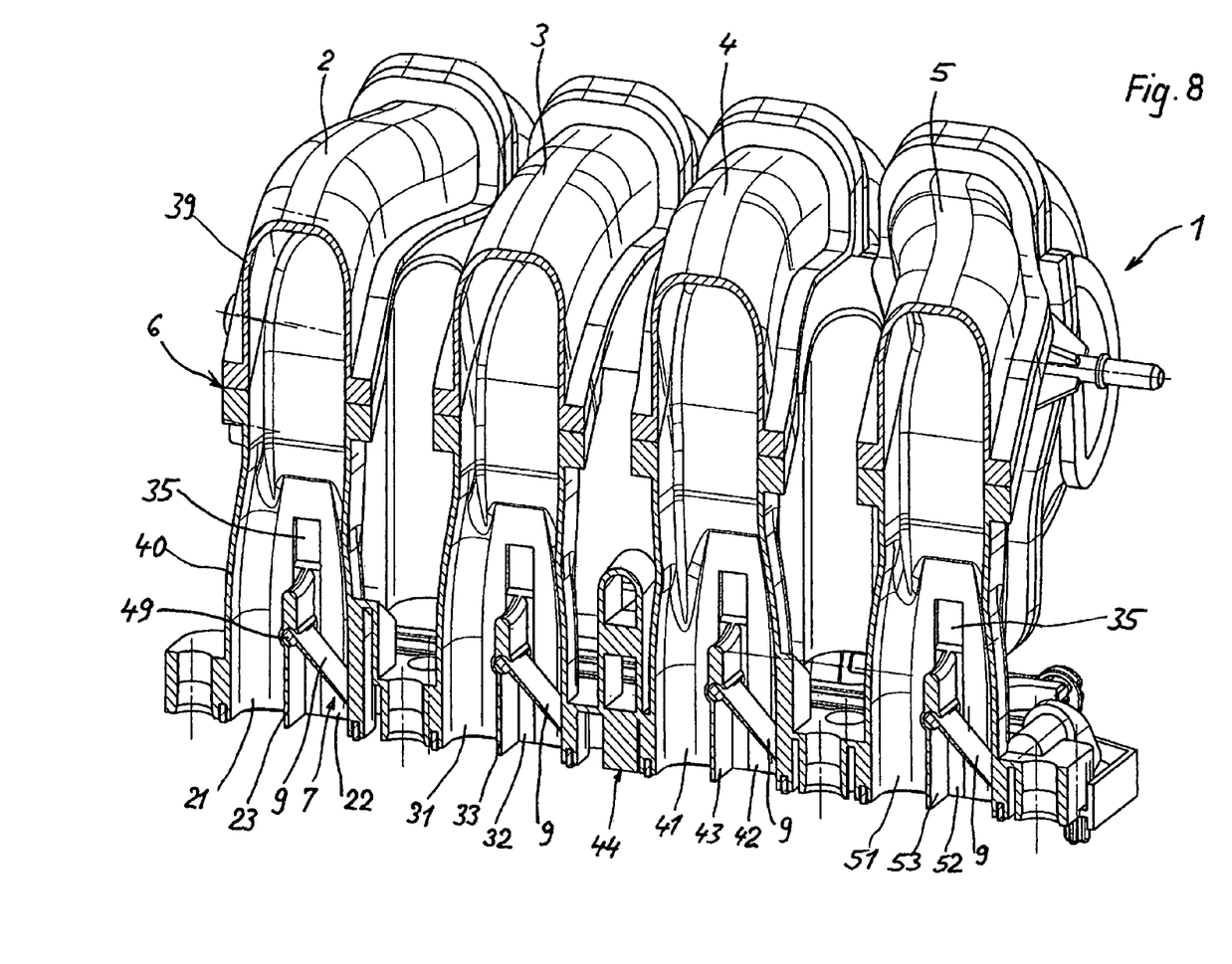
FIG. 8 is a view of a variant embodiment of the apparatus of FIG. 1.

FIG. 8 shows a variant embodiment of the intake module 1 in comparison with the embodiment depicted in FIG. 1. The housing 6 including the top shell 39 and the bottom shell 40 and the intake tracts 2, 3, 4 and 5 constructed in the housing all have the same design as in FIG. 1. However, the configurations of the partitions 23, 33, 43, 53 and the flap valves 9 arranged thereon as moveable components 7 have been modified. As shown in this diagram, the section of the partition 23 below the pivot bearing 49 of the flap valve 9 is constructed to be very thin so that the flap valve 9 does not generate any flow resistance when the valve is in the first position, that is to say, when the second intake pipe opening 22 is completely opened. Furthermore, the partitions 23, 33, 43 and 53 are shorter in length because the downwardly directed flap valve 9 makes this possible. In this embodiment, the pivot bearing 49 is at the upper end of the flap valve 9. The operation of the movable components 7 in the intake module 1 illustrated in FIG. 8 is the same as that previously described for the embodiment of FIGS. 1-7.

Figure 9:
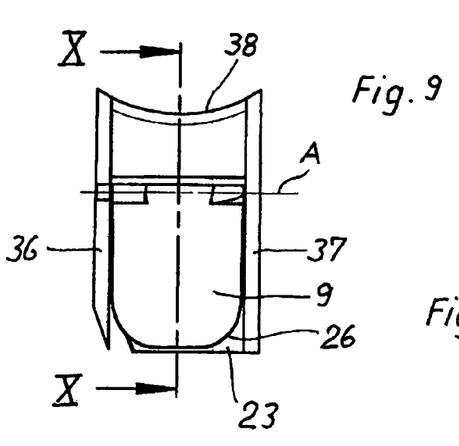
FIG. 9 is a front view of a partition and a flap valve for an intake module according to FIG. 8.
Figure 10:
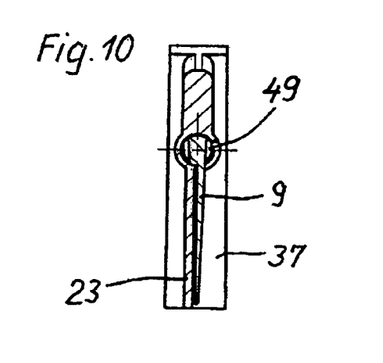
FIG. 10 is a sectional view taken along line X-X in FIG. 9.

FIG. 9 shows a front elevation view of the partition 23 from FIG. 8, and FIG. 10 shows a section through FIG. 9 taken along line X-X. As these diagrams show, the partition 23 includes lateral frame parts 36 and 37, the respective upper ends of which are arranged at the same height. Between the upper ends of the frame parts 36 and 37, the front edge 38 of the partition is constructed with a concave shape. The thickness of the bottom part of the partition 23 is such that, when the flap valve 9 is in contact with the partition 23, the cross section of the second intake pipe opening is no less than it is in the area in front of the pivot bearing 49.

Figure 11:
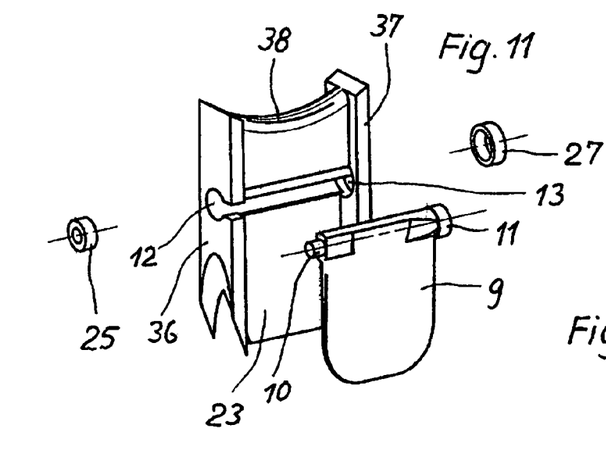
FIG. 11 is an exploded diagram of the partition of FIG. 9 with the valve.
Figure 12:
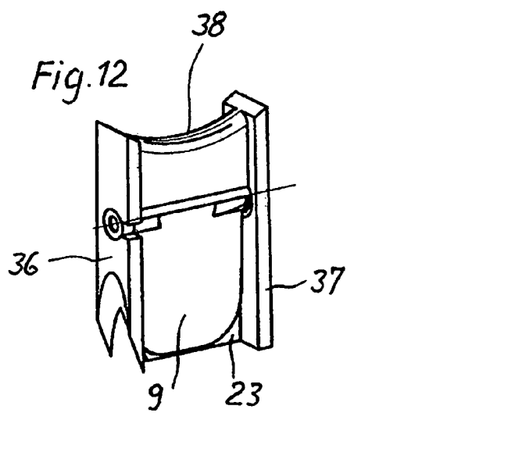
FIG. 12 is a perspective view of the arrangement according to FIG. 9.

FIGS. 11 and 12 show the partition 23 with the flap valve 9 arranged thereon in an exploded diagram and in a perspective view, respectively. Bearing bushings 25 and 27 may also be provided in this embodiment because journal bearings 10 and 11 are designed in the same way as indicated for the previously described illustrative embodiment.

The foregoing description and examples have been set forth merely to illustrate the invention and are not intended to be limiting. Since modifications of the described embodiment incorporating the spirit and substance of the invention may occur to persons skilled in the art, the invention should be construed broadly to include all variations within the scope of the appended claims and equivalents thereof.

What is claimed is:

1. An intake module for an internal combustion engine having at least one intake tract which has at least two intake pipe openings, a first one of said at least two intake pipe openings having an essentially constant cross section leading to the internal combustion engine and a second one of said at least two intake pipe openings of the same intake tract having a variable flow cross section, wherein said intake tract is formed in a housing in which a partition is provided for separating the intake pipe openings of the same intake tract from one another in a certain section and supporting a movable component on the partition so that the flow cross section of the second intake pipe opening is variable, wherein the movable component is constructed as a flap valve mounted at one end to pivot about an axis A; the flap valve is supported by journal bearings received in bearing openings in the partition, and one of the journal bearings on the flap valve and the bearing opening in which said one journal bearing is received have a different diameter from the other journal bearing and the bearing opening in which said other journal bearing is received.

2. An intake module according to claim 1, wherein the flap valve is adjustable between a first position in which the second intake pipe opening is completely opened and a second position in which the second intake pipe opening is completely closed.

3. An intake module according to claim 2, wherein the flap valve is completely inside the contour of the partition when the flap valve is in the first position.

4. An intake module according to claim 1, wherein the pivot axis is at the downstream end of the flap valve in the direction of flow through the second intake pipe opening.

5. An intake module according to claim 1, wherein the flap valve comprises a flap body with rounded edges at the end remote from the pivot axis.

6. An intake module according to claim 1, wherein an operating rod is provided operably connected with the flaps for moving the flaps.

7. An intake module according to claim 6, wherein a lever is provided on a journal bearing of each flap valve, and a free end of each lever is connected to the operating rod such that linear displacement of the operating rod will pivot the flap valves.

8. An intake module for an internal combustion engine having at least one intake tract which has at least two intake pipe openings, a first one of said at least two intake pipe openings having an essentially constant cross section leading to the internal combustion engine and a second one of said at least two intake pipe openings of the same intake tract having a variable flow cross section, wherein said intake tract is formed in a housing in which a partition is provided for separating the intake pipe openings of the same intake tract from one another in a certain section and supporting a movable component on the partition so that the flow cross section of the second intake pipe opening is variable, wherein the movable component is constructed as a flap valve mounted at one end to pivot about an axis A; the pivot axis is at the downstream end of the flap valve in the direction of flow through the second intake pipe opening, and an opening is provided in the partition upstream of the pivot axis of the flap valve, said opening having a contour which corresponds at least approximately to that of the flap valve such that said opening is closed when the flap valve is in said first position.

9. An intake module according to claim 8, wherein the flap valve is supported by journal bearings received in bearing openings in the partition.

10. An intake module according to claim 8, wherein an operating rod is provided operably connected with the flaps for moving the flaps.

11. An intake module according to claim 10, wherein a lever is provided on a journal bearing of each flap valve, and a free end of each lever is connected to the operating rod such that linear displacement of the operating rod will pivot the flap valves.

12. An intake module for an internal combustion engine having at least one intake tract which has at least two intake pipe openings, a first one of said at least two intake pipe openings having an essentially constant cross section leading to the internal combustion engine and a second one of said at least two intake pipe openings of the same intake tract having a variable flow cross section, wherein said intake tract is formed in a housing in which a partition is provided for separating the intake pipe openings of the same intake tract from one another in a certain section and supporting a movable component on the partition so that the flow cross section of the second intake pipe opening is variable, wherein the movable component is constructed as a flap valve mounted at one end to pivot about an axis A, and the pivot axis is at the upstream end of the flap valve in the direction of flow through the second intake pipe opening.

13. An intake module according to claim 12, wherein an operating rod is provided operably connected with the flaps for moving the flaps.

14. An intake module according to claim 12, wherein the flap valve is supported by journal bearings received in bearing openings in the partition.

15. An intake module according to claim 12, wherein the flap valve comprises a flap body with rounded edges at the end remote from the pivot axis.

16. An intake module according to claim 13, wherein a lever is provided on a journal bearing of each flap valve, and a free end of each lever is connected to the operating rod such that linear displacement of the operating rod will pivot the flap valves.

17. An intake module for an internal combustion engine having at least one intake tract which has at least two intake pipe openings, a first one of said at least two intake pipe openings having an essentially constant cross section leading to the internal combustion engine and a second one of said at least two intake pipe openings of the same intake tract having a variable flow cross section, wherein said intake tract is formed in a housing in which a partition is provided for separating the intake pipe openings of the same intake tract from one another in a certain section and supporting a movable component on the partition so that the flow cross section of the second intake pipe opening is variable, and wherein lateral edges of the partitions are received in grooves provided in walls of the respective intake tracts.

18. An intake module according to claim 17, wherein the lateral edges of the partitions are constructed as frame parts having a width which is greater than the thickness of the partitions.

19. An intake module according to claim 18, wherein the frame parts of each partition are of different lengths, and the front edge of the partition slopes from one side of the partition to the other.

20. An intake module according to claim 18, wherein the frame parts of each partition are of equal length, and the front edge of the partition has a concave curvature.

* * * * *